United States Patent
Oh et al.

(10) Patent No.: US 12,039,133 B2
(45) Date of Patent: Jul. 16, 2024

(54) CORRECTING TOUCH INPUTS

(71) Applicant: Google LLC, Mountain View, CA (US)

(72) Inventors: Young Seok Oh, Mountain View, CA (US); Sun-il Chang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/999,019

(22) PCT Filed: Jun. 3, 2020

(86) PCT No.: PCT/US2020/070117
§ 371 (c)(1),
(2) Date: Nov. 16, 2022

(87) PCT Pub. No.: WO2021/247086
PCT Pub. Date: Dec. 9, 2021

(65) Prior Publication Data
US 2023/0236698 A1     Jul. 27, 2023

(51) Int. Cl.
*G06F 3/041*     (2006.01)
*G06F 3/044*     (2006.01)

(52) U.S. Cl.
CPC ............ *G06F 3/0418* (2013.01); *G06F 3/044* (2013.01); *G06F 2203/04104* (2013.01)

(58) Field of Classification Search
CPC ........ G06F 3/0418; G06F 3/041; G06F 3/044; G06F 2203/04104
(Continued)

(56) References Cited

U.S. PATENT DOCUMENTS 9,874,974 B2   1/2018   Kim et al.
2011/0310038 A1   12/2011   Park et al.
(Continued)

FOREIGN PATENT DOCUMENTS

JP   2011048663 A   3/2011
JP   2013156925 A   8/2013
(Continued)

OTHER PUBLICATIONS

International Preliminary Report on Patentability from International Application No. PCT/US2020/070117 dated Dec. 15, 2022, 11 pp.
(Continued)

*Primary Examiner* — Kwin Xie
(74) *Attorney, Agent, or Firm* — Shumaker & Sieffert, P.A.

(57) ABSTRACT

A computing device can receive a first measured touch value, the first measured touch value indicating first touch input at a first location near a camera included in the computing device, receive a second measured touch value, the second measured touch value indicating second touch input at a second location farther from the camera than the first location, a density of touch sensors in the second location being greater than a density of touch sensors in the first location, generate a first compensated touch value based on the first measured touch value and a first scaling value, generate a second compensated touch value based on the second measured touch value and a second scaling value, the second scaling value being less than the first scaling value, and process the first touch input and the second touch input based on the first compensated touch value and the second compensated touch value.

9 Claims, 19 Drawing Sheets

(58) Field of Classification Search
USPC .............................................. 345/173–174
See application file for complete search history.

(56) References Cited

U.S. PATENT DOCUMENTS

| | | | |
|---|---|---|---|
| 2013/0241890 A1* | 9/2013 | Sharma ................. | G06F 3/0426 |
| | | | 345/175 |
| 2014/0104196 A1* | 4/2014 | Haungs .................. | G06F 3/041 |
| | | | 345/173 |
| 2014/0152579 A1* | 6/2014 | Frey ...................... | G06F 3/0416 |
| | | | 345/173 |
| 2015/0242053 A1 | 8/2015 | Gao et al. | |
| 2017/0102827 A1* | 4/2017 | Christiansson ......... | G06F 3/042 |
| 2017/0139527 A1 | 5/2017 | Nathan et al. | |
| 2017/0147141 A1* | 5/2017 | Khazeni ............ | G06F 3/041662 |
| 2017/0270342 A1* | 9/2017 | He ........................ | G06F 3/0418 |
| 2020/0159367 A1 | 5/2020 | Xia et al. | |

FOREIGN PATENT DOCUMENTS

| | | | | |
|---|---|---|---|---|
| JP | 2014011512 A | | 1/2014 | |
| JP | 2017506399 A | | 3/2018 | |
| WO | WO-2012005205 A1 | * | 1/2012 | ............... B05D 5/12 |
| WO | WO-2015195287 A1 | * | 12/2015 | ........... G06F 3/0412 |

OTHER PUBLICATIONS

Response to Communication Pursuant to Rules 161(1) and 162 EPC dated Jan. 11, 2023, from counterpart European Application No. 20751847.3, filed Jul. 10, 2023, 12 pp.

International Search Report and Written Opinion of International Application No. PCT/US2020/070117, dated Apr. 29, 2021, 15 pp.

Office Action, and translation thereof, from counterpart Japanese Application No. 2022-574627 dated Mar. 5, 2024, 8 pp.

\* cited by examiner

Compensated touch value map 330

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 50 | 50 | 50 | 0 | 0 | 0 | 0 |
| 0 | 50 | 100 | 50 | 0 | 0 | 0 | 0 |
| 0 | 50 | 50 | 50 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3D

CORRECTING TOUCH INPUTS

TECHNICAL FIELD

This description relates to computing devices that receive touch input.

BACKGROUND

Computing devices can include a touchscreen display that presents visual output and receives touch input. Some computing devices can include a camera inside the touchscreen display. Accurately processing touch input near the camera can be difficult.

SUMMARY

According to an example, a non-transitory computer-readable storage medium can comprise instructions stored thereon. When executed by at least one processor, the instructions can be configured to cause a computing device to receive a first measured touch value, the first measured touch value indicating first touch input at a first location (which may be near a camera included in the computing device), receive a second measured touch value, the second measured touch value indicating second touch input at a second location farther from the camera than the first location, a density of touch sensors in the second location being greater than a density of touch sensors in the first location, generate a first compensated touch value based on the first measured touch value and a first scaling value, generate a second compensated touch value based on the second measured touch value and a second scaling value, the second scaling value being less than the first scaling value, and process the first touch input and the second touch input based on the first compensated touch value and the second compensated touch value.

According to an example, a non-transitory computer-readable storage medium can comprise instructions stored thereon. When executed by at least one processor, the instructions can configured to cause a computing device to determine that a measured location of a touch input on a touchscreen is within a predefined area proximal to a camera (that is, meeting a proximity criterion with respect to the camera), determine a shift value for the touch input based on the measured location of the touch input, determine a shifted location for the touch input based on the measured location and the shift value, and process the touch input based on the shifted location. In practice, an area where an object such as a stylus or a user's finger contacts a touchscreen, may include a plurality of locations with touch inputs (i.e. non-zero measurements of applied force). Some of these may be within the predefined area and some may not be. The shift value may be applied to those of the measured locations which are within the area. Subsequently, an operation may be applied (e.g. based on the shifted locations and the measured values outside the predefined area) to estimate a location of the center of the area where the object touched the touchscreen.

According to an example, a method can comprise contacting a touchscreen at multiple known locations, the multiple known locations including at least a first location with a first density of touch sensors and a second location with a second density of touch sensors, the second density of touch sensors being less than the first density of touch sensors, determining multiple measured locations on the touchscreen corresponding to the multiple known locations, and generating a map, the map mapping the multiple measured locations to the multiple known locations.

According to an example, a non-transitory computer-readable storage medium can comprise instructions stored thereon. When executed by at least one processor, the instructions can be configured to cause a computing device to receive multiple touch inputs, the multiple touch inputs being received at different times and being included in a single moving contact, determine that a measured location of at least one of the multiple touch inputs is skewed, based on determining that the location of at least one of the multiple touch inputs is skewed, correct the skewed location of the at least one of the multiple touch inputs based on the location of at least one of the multiple touch inputs that is skewed and locations of at least two other of the multiple touch inputs, and process the multiple touch inputs with the corrected location.

In further examples, computer systems are provided comprising a processor and a computer-readable storage medium of any of the types defined above, and arranged to perform the instructions. The details of one or more implementations are set forth in the accompanying drawings and the description below. Other features will be apparent from the description and drawings, and from the claims.

BRIEF DESCRIPTION OF THE DRAWINGS

FIG. 3D shows compensated touch values for locations in the expanded area that were contacted by the finger according to an example implementation.

DETAILED DESCRIPTION

A touchscreen can have lower density of touch sensors near and/or over a camera to improve the camera's ability to capture images. The lower density of touch sensors near the camera can cause measured touch values to be lower than for locations farther from the camera with higher densities of touch sensors. A computing device can generate a compensated touch value based on the measured touch value and a scaling value. The scaling value can be associated with the location of touch input for which the touch value was measured. The density of touch sensors is a number of touch sensors per unit area of the touchscreen; for example, the density of touch sensors at any location may be defined as the number of touch sensors in a circle, rectangle or square of predetermined size and/or orientation centered at that location.

The lower density of sensors, and/or the transition between locations with different densities of touch sensors, can cause measured locations of touch inputs to be shifted from the actual and/or true locations of the touch inputs. The computing device 100 can determine shifted locations based on the measured locations and either shift values or shifted locations associated with the measured locations. In some examples, a different computing system can determine the shift values or shifted locations by contacting the touchscreen with a stylus at multiple known locations and mapping the known locations at which the stylus contacted the touchscreen to the measured touch locations.

The lower density of sensors, and/or the transition between locations with different densities of touch sensors, can cause measured locations of touch inputs to be skewed from the actual and/or true locations of the touch inputs. The computing device can determine that the measured locations are skewed by comparing the measured locations and/or shifted locations to other measured locations and/or shifted locations within a continuous contact. The computing device can correct the skewed locations based on the other measured locations, such as by applying a filter to the multiple locations.

Figure 1A:
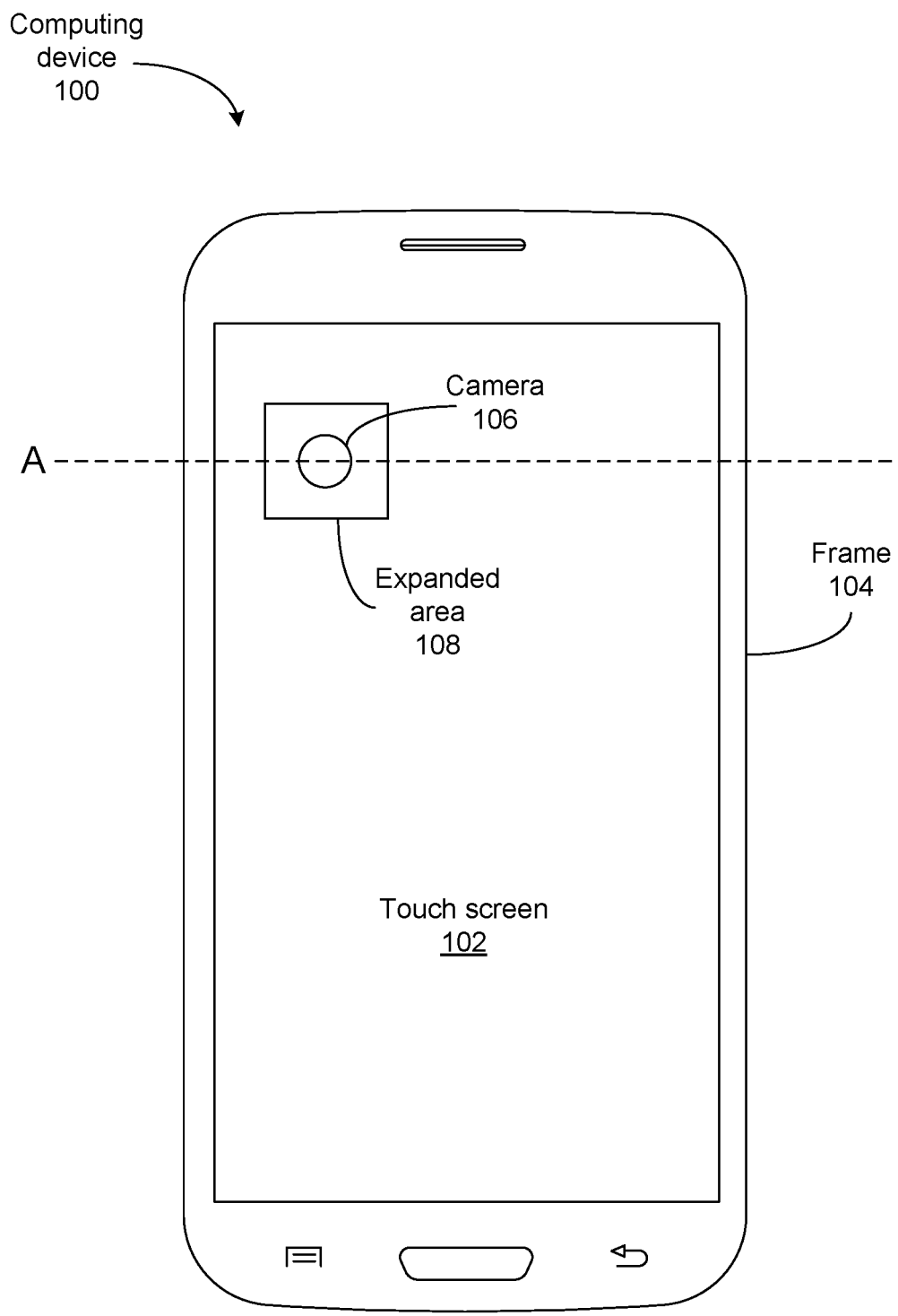
FIG. 1A shows a computing device according to an example implementation.

FIG. 1A shows a computing device 100 according to an example implementation. The computing device 100 can include, for example, a smartphone with a touchscreen 102, a tablet computing device with the touchscreen 102, a notebook or laptop computing device with the touchscreen 102, or a personal computing device with the touchscreen 102.

The touchscreen 102 can present visual output to a user. The touchscreen 102 can include pixels that emit colored light to collectively display pictures, icons, letters, or other images.

The touchscreen 102 can also receive touch input from the user. Touch input can include physical contact on the touchscreen 102 that causes a measurable change, such as a change in capacitance and/or change in resistance, within the touchscreen 102. In some examples, the touchscreen 102 can include a capacitive touchscreen that detects touch input by measuring changes in capacitance caused by part of a human body, such as the user's finger, contacting the touchscreen 102. In some examples, touch sensors included in the touchscreen 102 can include metal traces surrounding the pixels. In some examples, the touchscreen 102 can detect touch input by measuring changes in resistance.

The computing device 100 can include a frame 104 supporting, enclosing, and/or surrounding the touchscreen. The frame 104 can also support, enclose, and/or surround other components of the computing device 100 not shown in FIG. 1A, such as a memory, a processor, a speaker, a microphone, a wired communication interface, and/or a wireless communication interface, as non-limiting examples.

The computing device 100 can include a camera 106. The camera 106 can capture visual data from outside the computing device 100. The camera 106 can be included in and/or behind the touchscreen 102, and arranged to capture the visual data from light passing through the touchscreen 102.

FIG. 1A shows a front portion of the computing device 100, which includes the touchscreen 102 and the camera 106. In some examples, the computing device 100 can include a back portion, opposite from the front portion, which also includes a second camera but does not include a touchscreen or other display.

Figure 2:
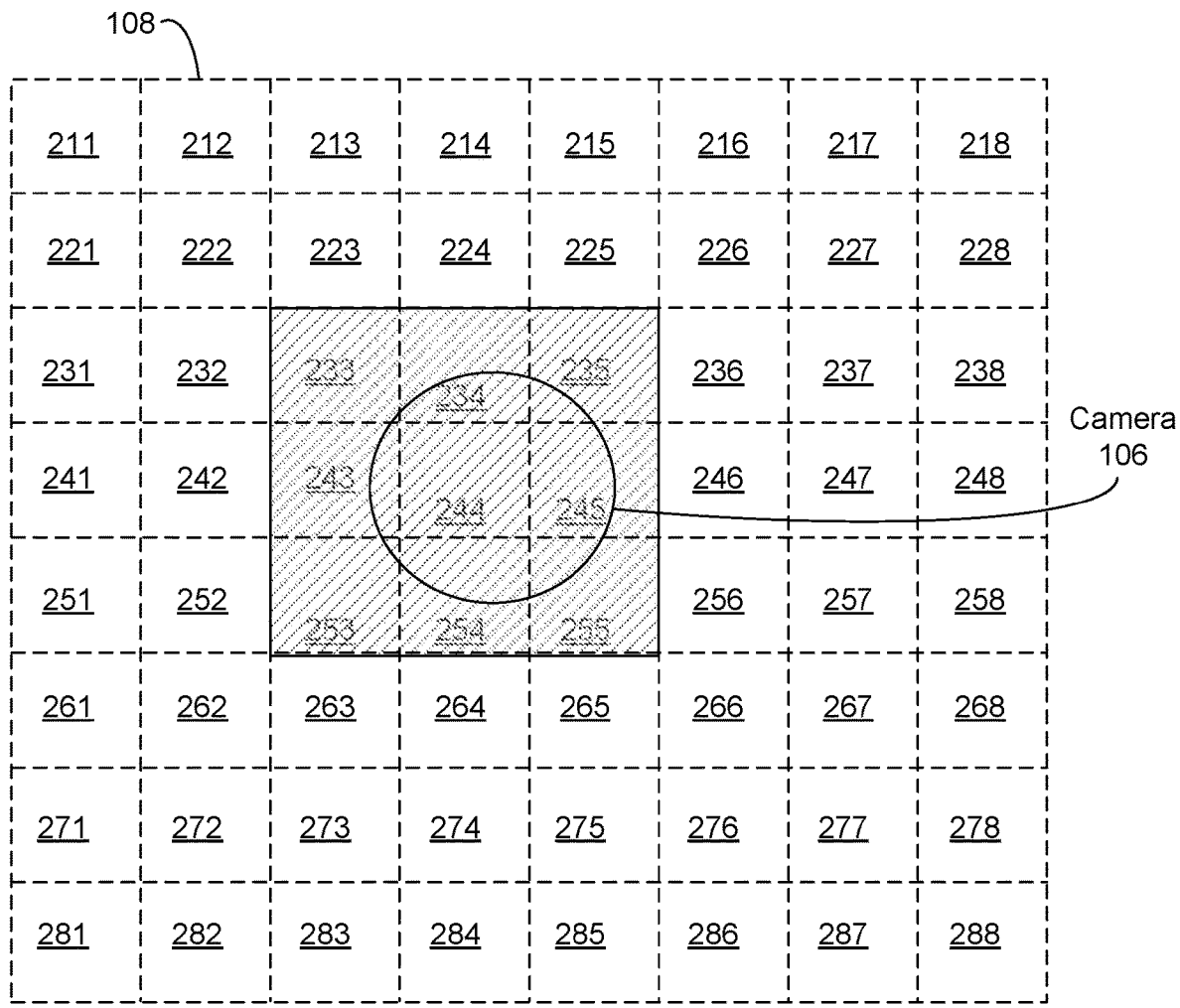
FIG. 2 shows an expanded area of a touchscreen and a camera included in the computing device shown in FIG. 1A according to an example implementation.

To allow the touchscreen 102 to present visual output in the area over the camera 106, but still allow the camera 106 to capture visual data, pixel density in an area of the touchscreen 102 over the camera 106 can be lower than pixel density in areas of the touchscreen 102 that are not over the camera 106. Here the term "over the camera" refers to a portion of the touchscreen for which the normal direction intercepts the camera. For some such portions of the touchscreen, the normal direction may intercept a light-capturing region of the camera. The lower pixel density allows the camera 106 to capture visual data sufficiently accurately, and presents visual output of satisfactory quality. However, the lower pixel density can cause non-uniformity of parasitic capacitance, which is measured to determine touch inputs, compared to other parts of the touchscreen. FIG. 2, described below, shows an expanded area 108 of the touchscreen 102 over and around the camera 106, with some portions of the touchscreen 102 in the expanded area 108 having lower pixel density than other portions of the touchscreen 102.

Figure 1B:
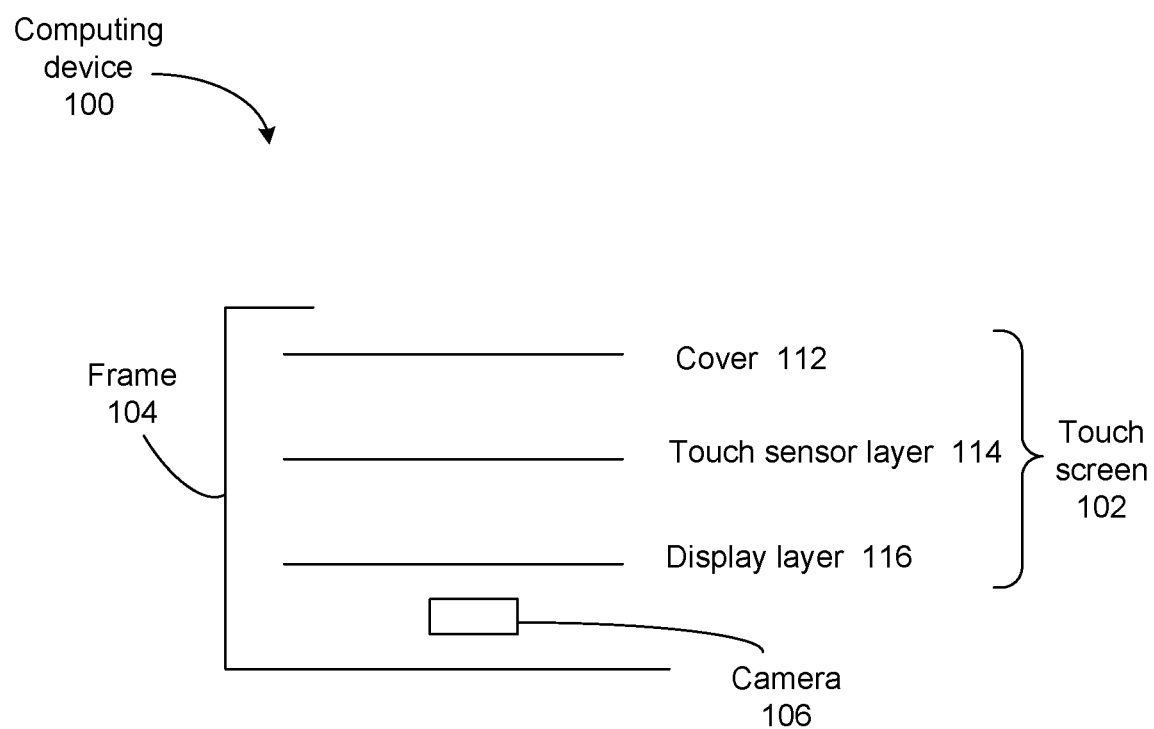
FIG. 1B shows a partial cross-sectional view of the computing device shown in FIG. 1A according to an example implementation.

FIG. 1B shows a partial cross-sectional view of the computing device 100 shown in FIG. 1A according to an example implementation. The cross-sectional view is along the dashed line denoted 'A' in FIG. 1A.

The touchscreen 102 can include a cover 112, a touch sensor layer 114, and/or a display layer 116. The cover 112 can be made of a transparent material such as glass or plastic. The cover 112 can cover and/or protect other components of the touchscreen 102, such as the touch sensor layer 114 and/or the display layer 116. The cover 112 can superpose, and/or be disposed above, other components of the touchscreen 102, such as the touch sensor layer 114 and/or the display layer 116.

The touchscreen 102 can include the touch sensor layer 114. The touch sensor layer 114 can detect and/or measure touch input. The touch sensor layer 114 can detect and/or measure touch input, such as by detecting and/or measuring changes in capacitance and/or changes in resistance in response to the touch input. In some examples, the touch sensor layer 114 can be disposed and/or located between the cover 112 and the display layer 116. In some examples, portions of the touch sensor layer 114 can surround portions of the display layer 116, such as by metal traces included in the touch sensor layer 114 surrounding display pixels included in the display layer 116.

The touchscreen 102 can include the display layer 116. The display layer 116 can generate and/or display visual output, such as graphical output. The display layer 116 can include multiple pixels that each generate colored light to collectively display pictures, icons, letters, or other images.

The computing device 100 can include the camera 106. In some examples, the camera 106 can be disposed and/or located below the touchscreen 102 (that is, in the normal direction to the cover 112 towards the display layer 116). In some examples, the camera 106 can be disposed and/or located between the touchscreen 102 and the frame 104. In some examples, the camera 106 can be disposed and/or located within the touch sensor layer 114 and/or display layer 116 of the touchscreen 102.

The computing device 100 can include the frame 104. The frame 104 can support, surround, and/or enclose components of the computing device 100, such as the touchscreen 102 and/or the camera 106.

FIG. 2 shows the expanded area 108 of the touchscreen 102 and the camera 106 included in the computing device 100 shown in FIG. 1A according to an example implementation. The expanded area 108 includes multiple locations 211-288. As denoted in FIG. 2, the second digit in the reference number for the locations 211-288 indicates the row of the respective location, and the third digit in the reference number denotes the column. While FIG. 2 divides the expanded area 108 into sixty-four locations, other levels of granularity can be implemented, and the expanded area can be divided into more or fewer than sixty-four locations.

In this example, the shaded locations 233, 234, 235, 243, 244, 245, 253, 254, 255 have lower densities of touch sensors than the other locations in the expanded area 108. A density of touch sensors can represent a number of touch sensors per unit of area of the touchscreen 102 that superposes the touch sensors, and/or a number of touch sensors under a given area of the touchscreen 102. In some examples, the lower densities of touch sensors can include a lower density of pixels and/or a lower density of metal traces, surrounding the pixels, of which changes in capacitance are measured. In some examples, the shaded locations 233, 234, 235, 243, 244, 245, 253, 254, 255 with lower densities of touch sensors can be more proximal to, and/or closer to, the camera 106 than the other locations in the expanded area 108. The term "proximal" is used to mean "meeting a proximity criterion". For example, the proximity criterion may be that the location is within a predetermined distance of the camera, or that it overlies the camera (i.e. a normal to the sensor layer at the location intercepts the camera), or that the location is within a predetermined distance in the plane of the sensor layer 114 from a portion of the sensor layer 114 which lies on an optical axis of the camera. The change in density can be abrupt, with adjacent locations having much higher or lower densities of touch sensors than each other, or gradual, with a path of locations gradually increasing or decreasing in density of touch sensors. In some examples, the other locations with higher densities of touch sensors can be farther from, and/or less proximal to, the camera 106 than the locations 233, 234, 235, 243, 244, 245, 253, 254, 255. In some examples, the locations 233, 234, 235, 243, 244, 245, 253, 254, 255 with lower density of touch sensors can fully superpose the camera 106 (i.e. entirely cover the camera 106, as viewed in the direction transverse to the cover 112).

Figure 3A:
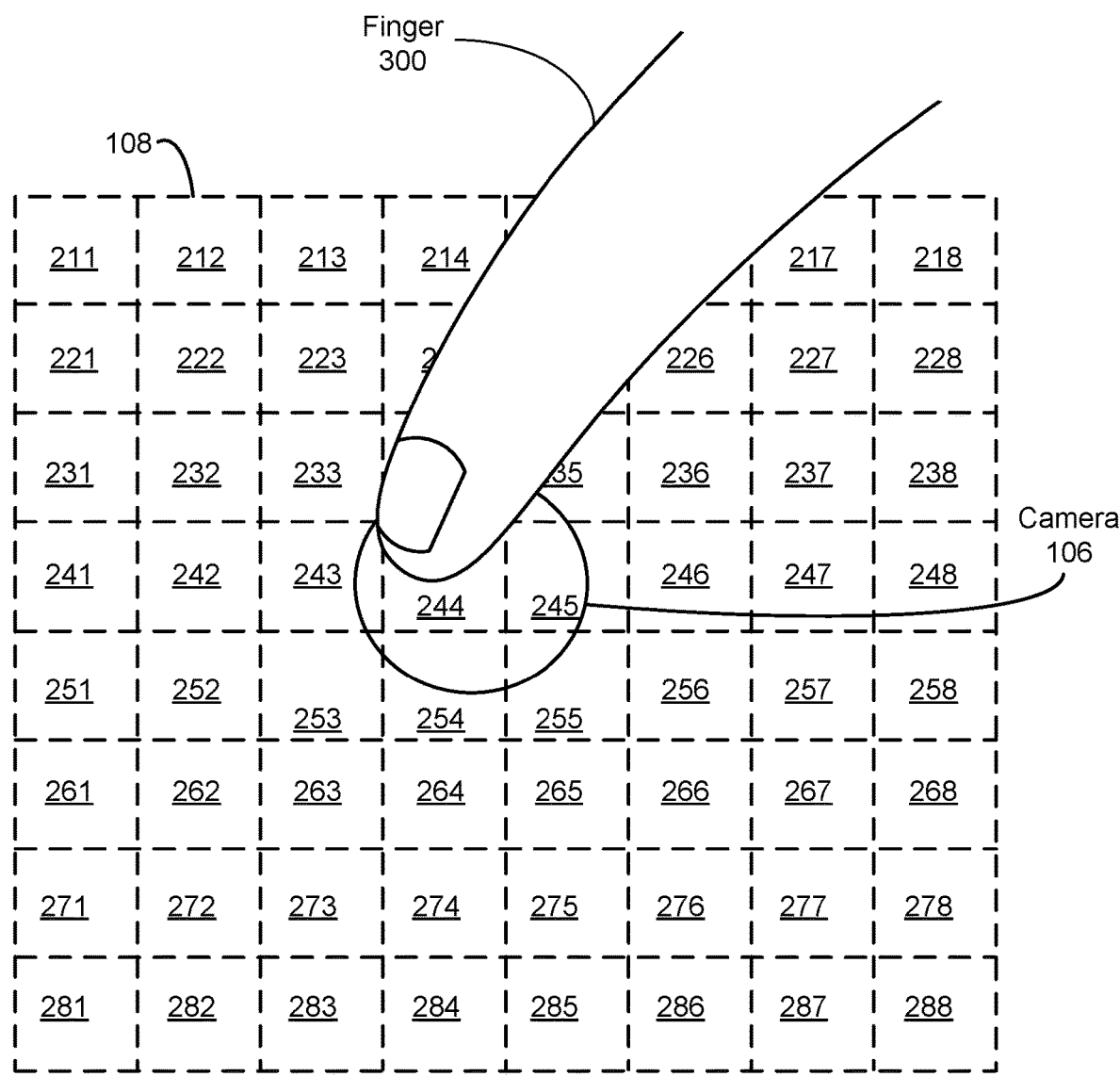
FIG. 3A shows a finger contacting a portion of the expanded area near a camera according to an example implementation.

FIG. 3A shows a finger 300 contacting a portion of the expanded area 108 near the camera 106 according to an example implementation. The finger 300 can contact any number of locations 211-288 inside or outside the expanded area 108.

Figure 3B:
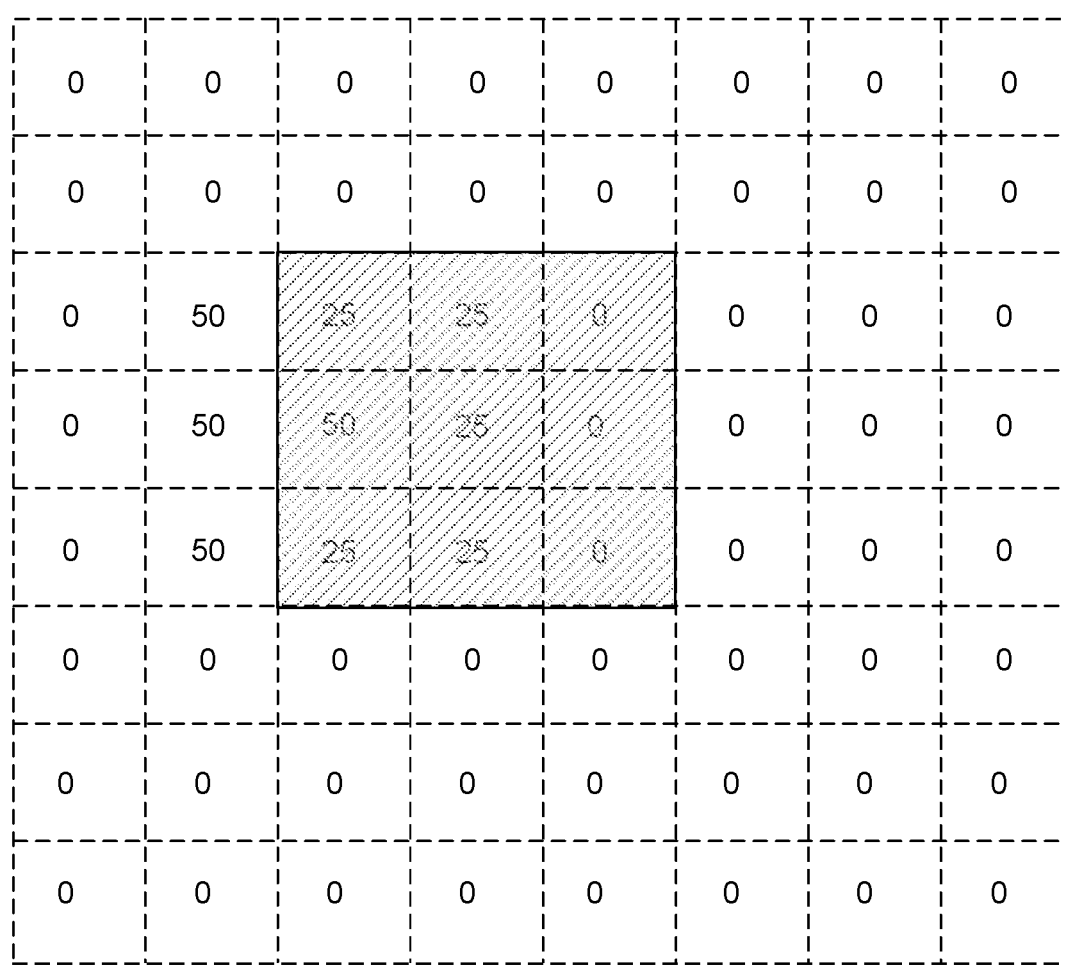
FIG. 3B shows measured touch values for locations in the expanded area that were contacted by the finger according to an example implementation.

FIG. 3B shows measured touch values for locations in the expanded area 108 that were contacted by the finger 300 according to an example implementation. FIG. 3B shows a map 310 of measured touch values corresponding to the locations 211-288 shown in FIGS. 2 and 3A. For ease of viewing, the reference numbers of the locations 211-288 to which the measured touch values correspond are not shown in FIG. 3B. However, the locations with lower densities of touch sensors are shaded for ease of reference. While FIG. 3B shows the measured touch values graphically in a two-dimensional map, the measured touch values can be represented and/or stored in other formats, such as in a comma-separated value file or a two-dimensional array. Measured touch values can represent raw data received from touch sensors, such as changes in capacitance and/or changes in resistance. The measured touch values can include a range of numerical values, such as a lower bound of zero (0) to indicate no contact or touch was detected and an upper bound to represent the maximum measurable force or change of capacitance and/or resistance. A measured location of a touch input can represent a location at which a measured touch value is greater than zero (0).

In the example shown n FIG. 3B, the areas with values of 0 indicate that no contact or touch was measured or detected at the locations corresponding to areas with values of 0. Also in this example, the areas corresponding to locations 232, 242, 243, and 252 have measured touch values of 50. Also in this example, the areas corresponding to locations 233, 234, 244, 253, 254 have measured touch values of 50. These measured touch input values are examples, and the computing device 100 could measure other touch input values. Based only on these raw touch input data, the contact by the finger 300 would appear to be placed most heavily toward the left, along the second column, as reflected by the measured touch values of fifty for locations 232, 242, 252. However, as discussed above, the locations 233, 234, 235, 243, 244, 245, 253, 254, 255 have lower densities of touch sensors than other locations, which can cause the measured values at the locations 233, 234, 235, 243, 244, 245, 253, 254, 255 to be lower than the actual contact by the finger 300 should reflect. To correct for inaccurately low measured touch values, the computing device 100 can compensate for the lower density of touch sensors by increasing the touch values for the locations 233, 234, 235, 243, 244, 245, 253, 254, 255.

Figure 3C:
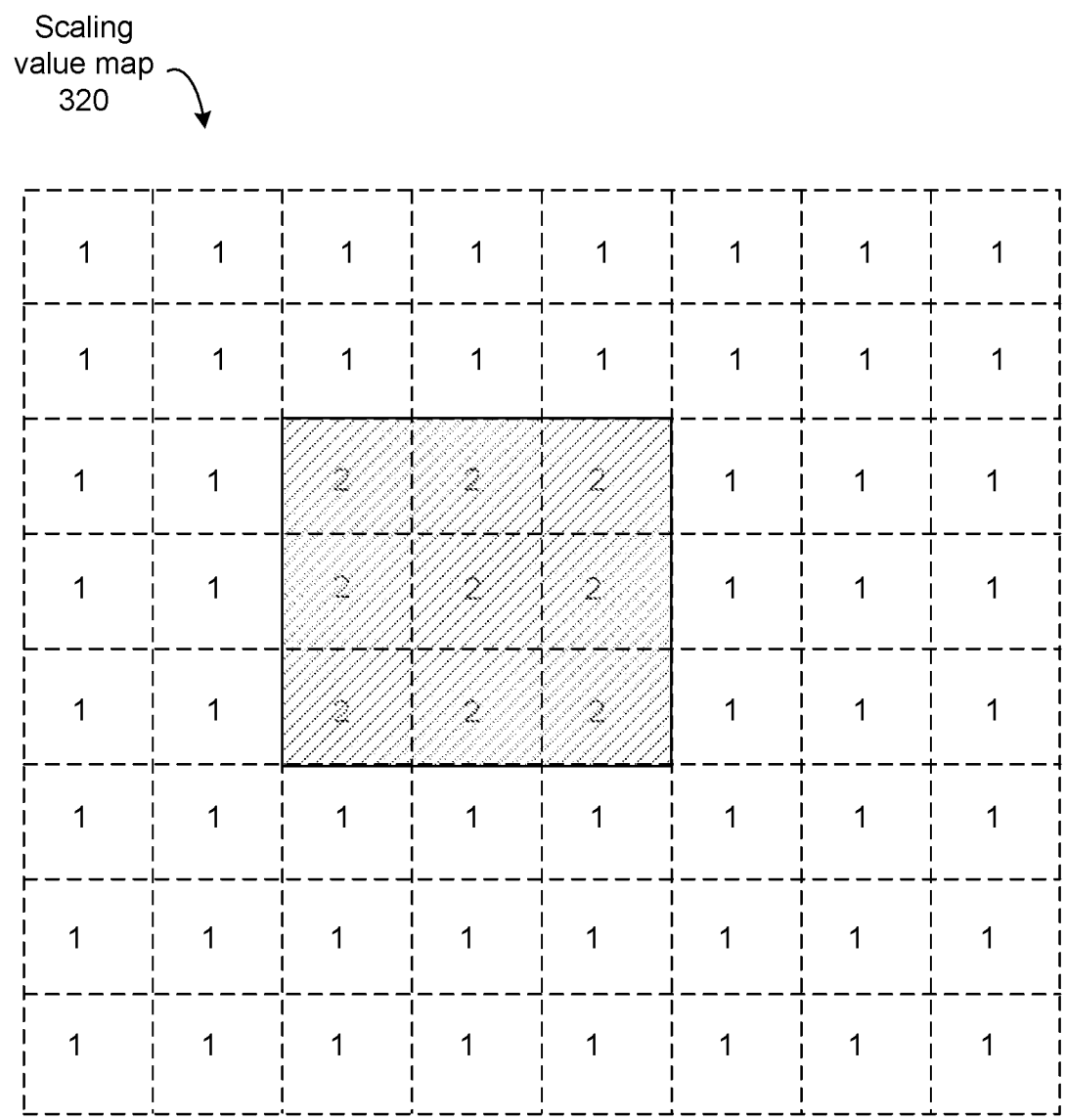
FIG. 3C shows a scaling map for locations in the expanded area according to an example implementation.

FIG. 3C shows a scaling map 320 (or "scaling value map") for locations in the expanded area according to an example implementation. A scaling map can associate scaling values with locations. The locations can be identified by x-values and y-values where the locations represent points on the touchscreen 102, and/or by ranges of x-values and y-values where the location represents a rectangular area on the touchscreen 102. The scaling map 320 shows scaling values by which the measured touch values will be multiplied to compensate for the lower density of touch sensors in the locations 233, 234, 235, 243, 244, 245, 253, 254, 255 that are proximal to, and/or near, the camera 106. Scaling values can be values associated with locations that will correct for lower densities of touch sensors, so that a contact by the same object with the same amount of force will, after correction based on the measured touch value and the scaling value, have the same compensated touch value in different locations, even if the different locations have different densities of touch sensors.

In this example, the scaling values for the locations 233, 234, 235, 243, 244, 245, 253, 254, 255 that are proximal to, and/or near, the camera 106, are two (2), and the scaling values for other locations is one (1). This is merely an example, and other scaling values can be included and/or stored in the scaling value map 320 to compensate for the lower density of touch sensors in some locations. The scaling values can include two values, in the example shown in FIG. 3C, or the scaling values can be more granular, with many more than two distinct values represented on the scaling map. While FIG. 3C shows the scaling value map 320 graphically in a two-dimensional map, the scaling value map 320 can be represented and/or stored in other formats, such as in a comma-separated value file or a two-dimensional array. In some examples, the scaling values for each location can be inversely proportional to the density of touch sensors in the respective location, and/or a ratio of scaling values of two different locations to each other can be inversely proportional to a ratio of the densities of the touch sensors in those same two different locations to each other.

The computing device 100 can correct and/or compensate for the lower density of touch sensors in locations 233, 234, 235, 243, 244, 245, 253, 254, 255 by multiplying the measured touch values shown in FIG. 3B by the scaling values in FIG. 3C. The product of multiplying the measured touch values shown in FIG. 3B by the scaling values in FIG. 3C can be compensated touch values.

FIG. 3D shows compensated touch values for locations in the expanded area 108 that were contacted by the finger according to an example implementation. The compensated touch values are represented in FIG. 3D within a compensated touch value map 330 (or "compensated value map"). While FIG. 3D shows the compensated value map 330 graphically in a two-dimensional map, the compensated value map 330 can be represented and/or stored in other formats, such as in a comma-separated value file or a two-dimensional array. Compensated touch values can be numerical values with a same range as the measured touch values that represent force applied by an object after correcting and/or compensating the measured touch value by the scaling value. Compensated touch values can be passed to, and/or processed by, an application and/or operating system as touch input to be handled by the application and/or operating system.

The computing device 100 can process the compensated touch values as the touch input to determine how to respond to the touch input. The compensated touch value of 100 for location 243, and compensated touch values of 50 for locations 232, 233, 234, 242, 244, 252, 253, 254 indicate that the contact by the finger 300 was strongest and/or heaviest at location 243, and was also significant for locations 232, 233, 234, 242, 244, 252, 253, 254.

Figure 3E:
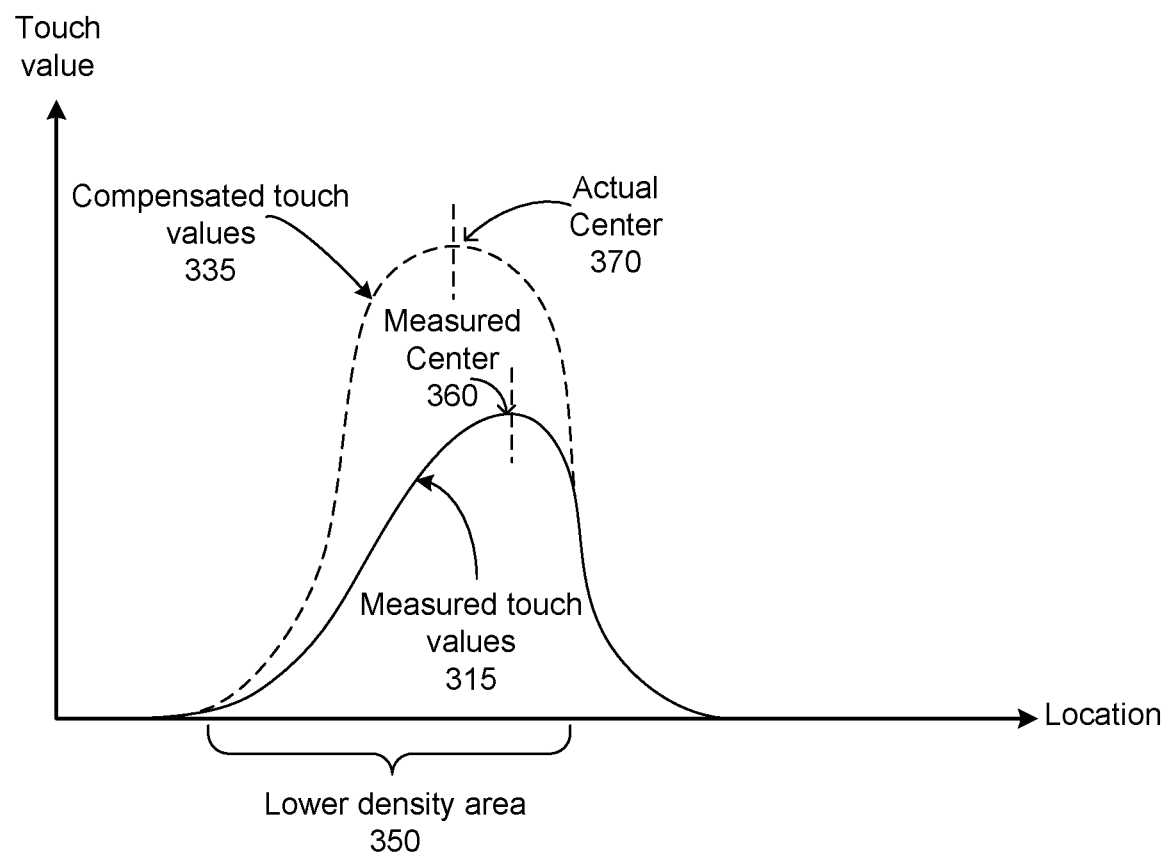
FIG. 3E is a graph showing measured touch values and compensated touch values as a function of location according to an example implementation.

FIG. 3E is a graph showing measured touch values 315 and compensated touch values 335 as a function of location according to an example implementation. The graph of FIG. 3E shows touch values as a function of location in only a single direction, such as either vertical or horizontal. The smooth curves of the measured touch values 315 and compensated touch values 335 shown in FIG. 3E show greater granularity of measured touch values, and/or division of the touchscreen 102 and/or expanded area 108 into more locations, than shown in the preceding figures. Furthermore, in this example there may be different scaling values for different corresponding locations within the lower density area e.g. with the scaling value rising towards the centroid of the lower density area 350. The difference between the compensated touch values 335 and the measured touch values 315 in the lower density area 350, which can correspond to the locations 233, 234, 235, 243, 244, 245, 253, 254, 255 that have lower density of touch sensors, indicates the effect of multiplying the measured touch values by the scaling values. The skewed curve of the measured touch values 315 would incorrectly show a touch contact that was strong on the right side of the contact. The symmetrical curve of the compensated touch values 335 correctly shows a touch contact that is strongest in a center of the contact.

In the example shown in FIG. 3E, the skewed curve of the measured touch values 315 shows a measured center 360, at a peak of the measured touch values curve 315, that is skewed and/or shifted to the right of the actual center 370 of the contact, as shown by the peak of the compensated touch values 335 curve. The computing device 100 can determine an accurate location of a center of a contact, at the actual center 370 and/or peak of the compensated touch values 335 curve, by compensating the measured touch values based on the compensated touch value map 330.

Figure 4A:
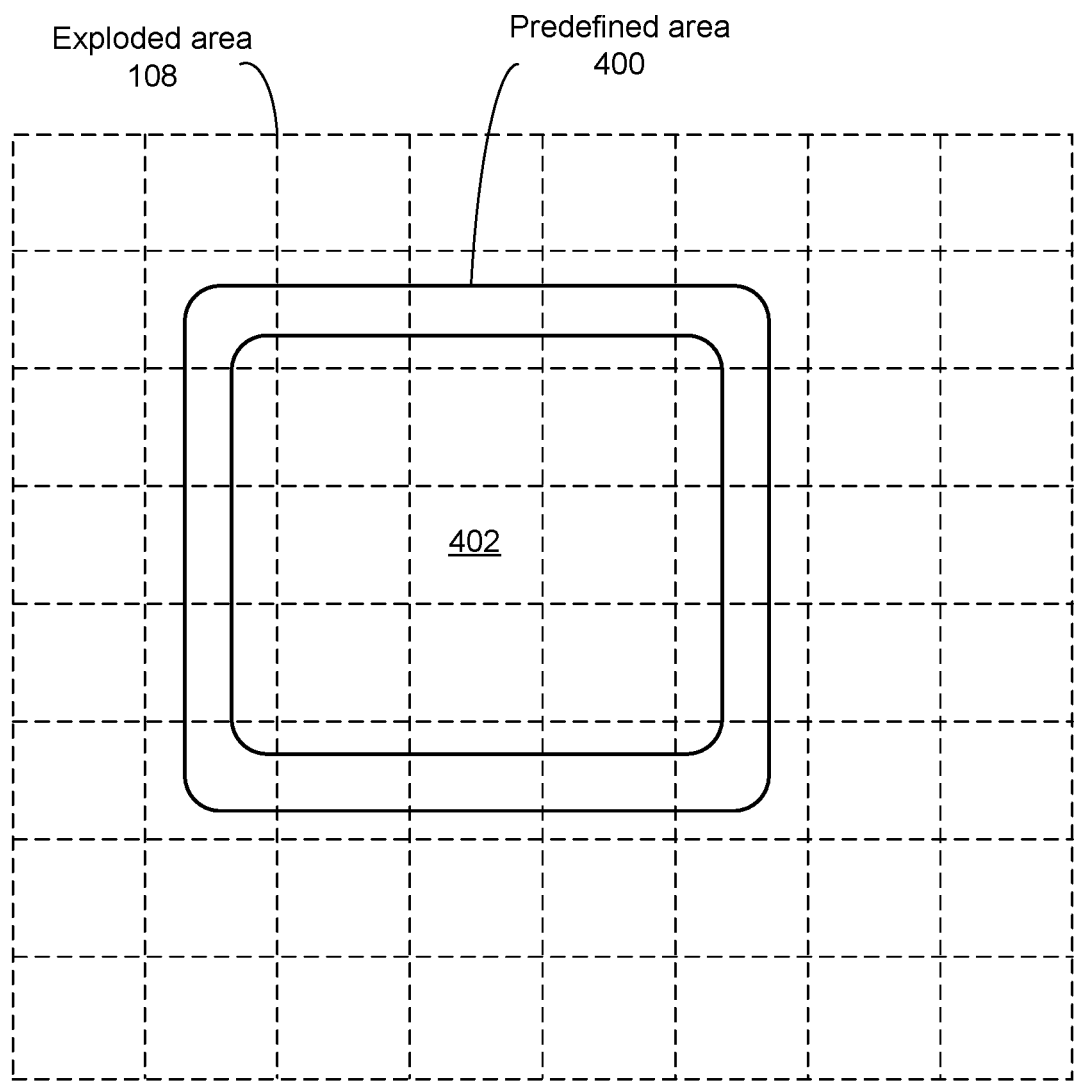
FIG. 4A shows a predefined area within the expanded area in which measured locations will be shifted according to an example implementation.

FIG. 4A shows a predefined area 400 within the expanded area 108 in which measured locations will be shifted according to an example implementation. The predefined area 400 can be an area on the touchscreen 102 in which measured locations can be shifted and/or incorrect due to change in density of touch sensors. The predefined area 400 can be stored in the computing device 100, such as in a memory of the computing device 100. In some examples, the predefined area 400 is on and/or at an edge of the locations with lower density of touch sensors. In some examples, the predefined area 400 is at an interface between the locations with lower density of touch sensors and the locations with the normal and/or standard density of touch sensors.

In some examples, the predefined area 400 has a shape that is homeomorphic with an annulus. Two shapes can be considered to be homeomorphic if the shapes can be morphed into each other by bending or stretching their respective portions without breaking, cutting or attaching any of their respective portions. The predefined area 400 can define a hole 402 which is not part of the predetermined area 400, and/or the hole 402 can be bounded by the predefined area 400. The predefined area 400 can have a shape surrounding the hole 402 such as a square, a circle, a rectangle, or an ellipse, as non-limiting examples. The hole 402 can superpose at least a portion of the camera 106 (not shown in FIG. 4A).

In some examples, the predefined area 400 has a shape that is homeomorphic with a square, such as a square, a circle, a rectangle, or an ellipse, as non-limiting examples. The predefined area 400 can superpose at least a portion of, and/or all of, the camera 106.

In some examples, the transition from lower density of touch sensors to higher density of touch sensors within the expanded area of the touchscreen 102 within the predefined area 400 can cause measured touch locations to be shifted outward, and/or away from the camera 106, compared to the actual locations of the contacts from which the touch locations are measured. The computing device 100 can correct the outward shift by shifting the measured locations inward toward the camera 106. The computing device 100 can shift the measured locations inward by adding a vector, such as an x-value and a y-value, to the measured touch location. The computing device 100 can determine the vector to add to the measured touch location by mapping the measured touch location to a vector. The measured touch locations and vectors can be associated with each other on a stored map and/or table, a comma separated value file, or a two-dimensional array, as non-limiting examples.

Figure 4B:
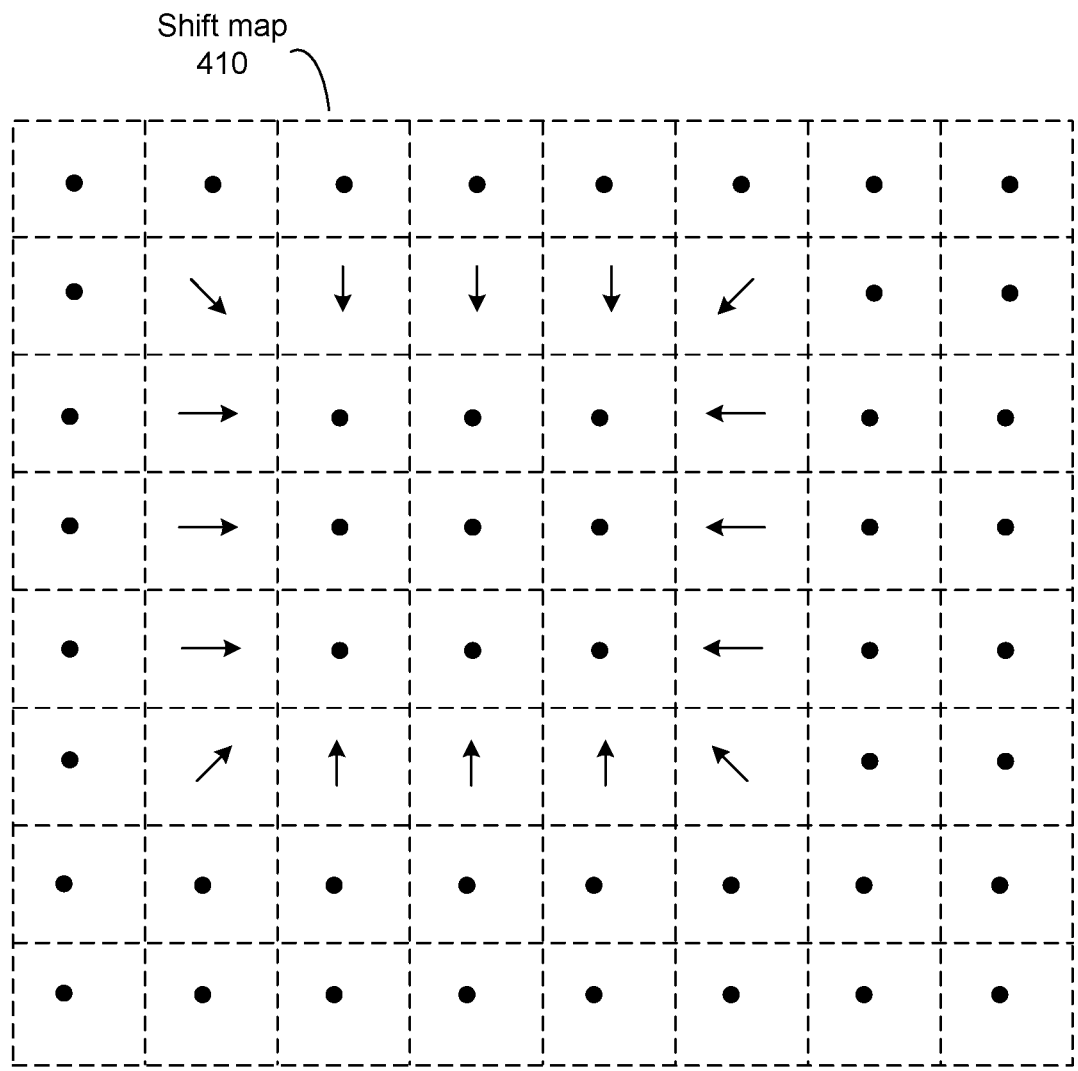
FIG. 4B shows shift values for correcting measured locations according to an example implementation.

FIG. 4B shows shift values for correcting measured locations according to an example implementation. Shift values can be vectors by which measured touch values will be changed to arrive at corrected and/or shifted values. In this example, the shift values are shown graphically on a shift map 410. The bullet holes show measured locations for which no shift is needed. The arrows show a shift value graphically. The shift values can also be represented as a pair of values, such as a positive or negative value for each of a horizontal (x) direction and a vertical (y) direction.

The computing device 100 can add the shift values to the measured touch locations to determine correct, shifted locations. The computing device 100 can determine the shift values based on the measured touch locations, such as by mapping the measured touch values to the shift locations. The computing device 100 can process the touch input based on the shifted values and/or shifted locations. Shifted values and/or shifted locations can be locations for which touch inputs will be processed after correcting for shift caused by the change in density of touch sensors. In some examples, the computing device 100 can determine shifted locations and/or corrected locations directly based on the measured touch locations, such as by mapping the measured touch locations to corrected locations and/or shifted locations. In practice, an area where an object such as a stylus or a user's finger, may include a plurality of locations with non-zero touch values. Some of these may be within the predefined area and some may not. The shift value may be applied to those of the measured locations which are within the area. Subsequently, an operation may be applied (e.g. based on the shifted locations and the (unshifted) measured values outside the predefined area) to estimate a location of the center of the area where the object touched the touchscreen. For example, the estimated location may be a weighted average of the shifted and unshifted locations, where the weights are the respective touch values or the compensated touch values. Or the touch values (or the compensated touch values) at the shifted and unshifted locations may be used in a curve fitting process, to find a peak of the curve.

The computing device 100, and/or another computing system, can determine the shift values experimentally. In some examples, a computing system can cause a stylus or other object to contact the touchscreen 102, or another touchscreen with similar hardware features as the touchscreen 102 and/or computing device 100, at multiple known locations on the touchscreen. The computing system can map the known touch locations to corresponding measured touch locations, and/or associate the known touch locations to the corresponding measured touch locations. The computing system can determine differences between the known touch locations and the corresponding measured touch locations. The computing system can store the differences between the known touch locations and the corresponding measured touch locations as shift values in association with the corresponding measured touch locations. The computing system can store the shift values in association with the corresponding measured touch locations as a shift map 410 as shown in FIG. 4B, or in other formats, such as a table, a comma separated value file, or a two-dimensional array, as non-limiting examples.

Figure 4C:
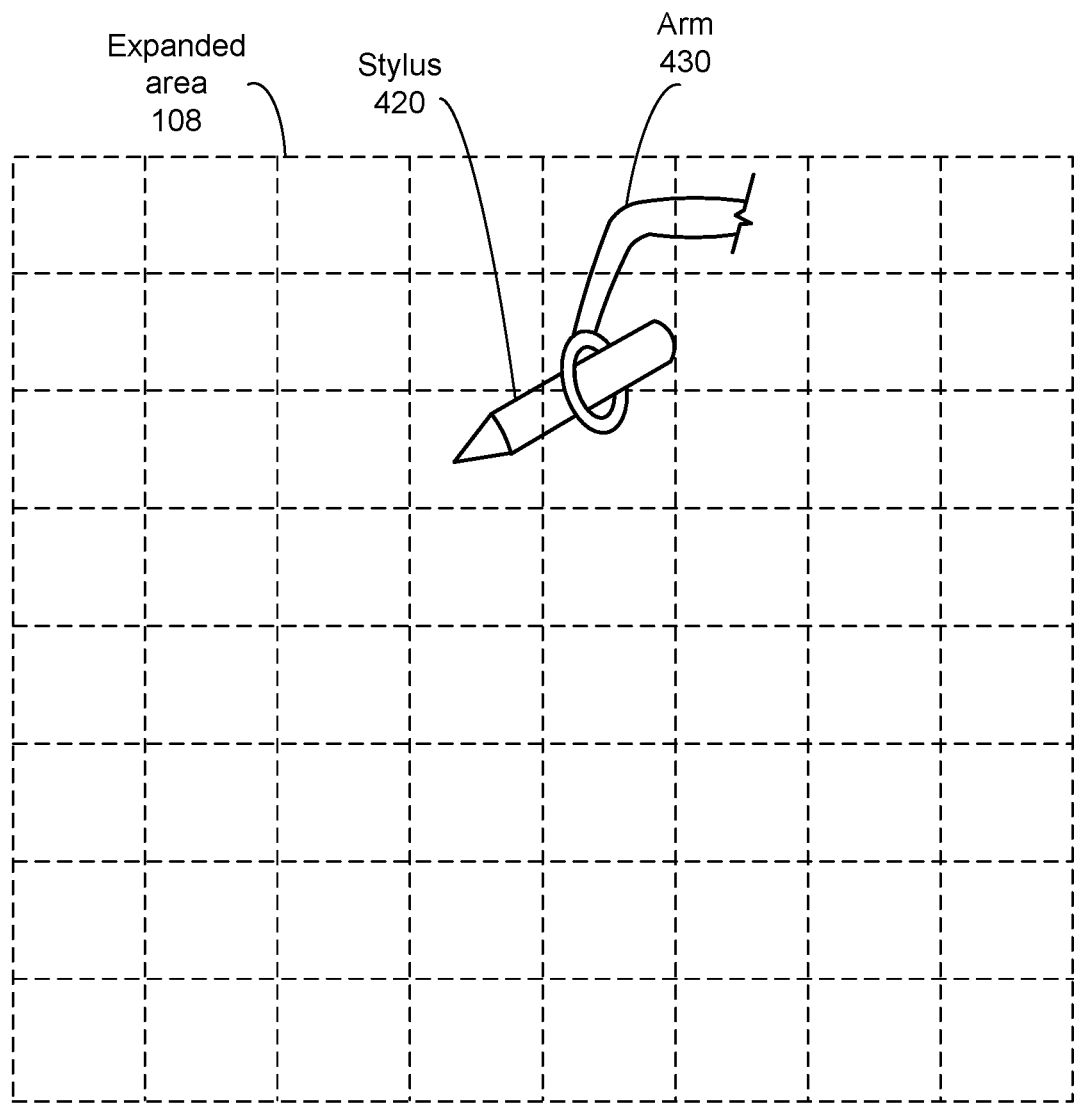
FIG. 4C shows an arm causing a stylus to contact the expanded area according to an example implementation.

FIG. 4C shows an arm 430 causing a stylus 420 to contact the expanded area 108 according to an example implementation. The arm 430 and/or stylus can be controlled by a computing system that causes the stylus 420 to contact the touchscreen 102, and/or the expanded area 108 within the touchscreen 102, in multiple known locations. The known locations can be locations on the touchscreen 102 which are previously determined and/or where the stylus 420 is intended to contact the touchscreen 102, and/or where instruments, external to the computing device 100 and/or computing system that the stylus 420 is contacting, measure the stylus as contacting. The locations on the touchscreen 102 at which the stylus 420 contacts the touchscreen 102 can be known to the computing system, and/or predetermined. The computing system can determine shift values based on differences between the known locations of the contacts and the measured touch locations of the contacts. The computing system can store the determined shift values, such as in a shift map 410 as shown in FIG. 4B, or in other formats, such as a table, a comma separated value file, or a two-dimensional array, as non-limiting examples. In some examples, the computing system can generate the shift map 410 based on the known locations of the contacts and the measured touch locations of the contacts. The computing system, and/or an intermediary computing system, can provide the stored shift values to the computing device 100.

In some examples, the measured touch locations can be measured centers of the contacts, such as the measured center 360 shown in FIG. 3E that results from skewing caused by reduced sensor density in some areas. In these examples, the computing device 100 can shift locations of a measured center 360 to an actual center based on the shift map 410.

Figure 5:
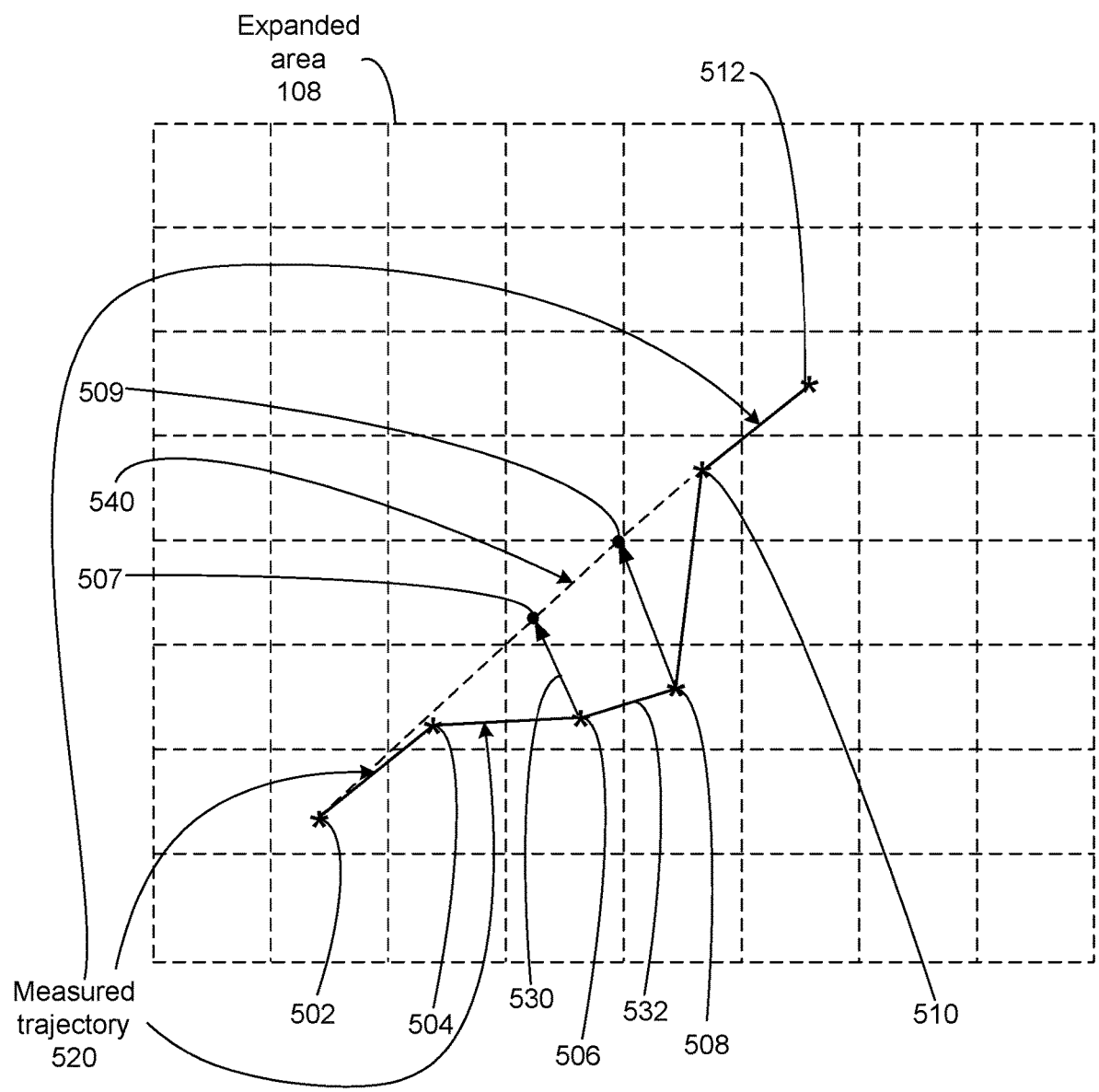
FIG. 5 shows measured touch locations and corrected touch locations according to an example implementation.

FIG. 5 shows measured touch locations 502, 504, 506, 508, 510, 512 and corrected touch locations 507, 509 according to an example implementation. The computing device 100 can receive multiple touch inputs at different times. The computing device 100 can receive the multiple touch inputs within a predetermined time period, such as within one second of each other. This can done using respective recorded times associated with the measured touch locations. The multiple touch inputs can be part of, and/or included in, a single moving contact across the touchscreen 102 and/or expanded area 108 of the touchscreen 102. The measured touch locations 502, 504, 506, 508, 510, 512 can represent measured locations of the multiple touch inputs. In some examples, the change to the density of the touch sensors can cause some of the measured locations to be skewed from the actual locations of the contacts. In some examples, the change to the density of the touch sensors can cause some of the measured locations to be skewed from the actual locations of the contacts even after performing the shifts described above with respect to FIGS. 4A, 4B, and 4C.

The computing device 100 can determine that a location of at least one of the multiple measured touch locations 502, 504, 506, 508, 510, 512 is skewed. In the example shown in FIG. 5, the computing device 100 determines that measured touch locations 506, 508 are skewed. The distance between the locations 506, 508 and corrected locations 507, 509 is exaggerated in FIG. 5 for illustrative purposes. The computing device 100 can determine that at least one of the multiple measured touch locations 502, 504, 506, 508, 510, 512 is skewed, based on comparing the locations and/or times of the measured touch locations 502, 504, 506, 508, 510, 512 to each other (here the phrase "the time of a measured touch location" means a time at which force was measured at the location; this time may be recorded), such as by comparing the locations and/or times of the measured touch locations 502, 504, 506, 508, 510, 512 to predicted curves and/or arcs, and/or by applying one or more filters to the locations and/or times of the measured touch locations 502, 504, 506, 508, 510, 512 and determining that the location of at least one of the measured touch locations 502, 504, 506, 508, 510, 512 is skewed.

Based on determining that the location of at least one of the measured touch locations 502, 504, 506, 508, 510, 512 is skewed, the computing device 100 can correct the measured location of the touch input that is determined to be skewed, such as the measured touch locations 506, 508, based on the location of the touch value and/or measured touch location 506, 508 and at least two other touch values, such as the measured touch locations 502, 504, 510, 512. In some examples, the computing device 100 can correct the skewed location(s) by applying a filter to the measured touch locations 502, 504, 506, 508, 510, 512. In some examples, the filter can include an infinite impulse response filter, a Kalman filter, and/or a Butterworth filter.

In the example shown in FIG. 5, vectors 530, 532 represent corrections to the measured touch locations 506, 508. The computing device 100 can add the vectors 530, 532 to the measured touch locations 506, 508, to arrive at the corrected locations 507, 509 and/or a corrected path. The computing device 100 can process the touch inputs based on the corrected locations 507, 509 and/or corrected path 540 and the measured touch locations 502, 504, 510, 512 that are determined not to have been skewed.

Figure 6:
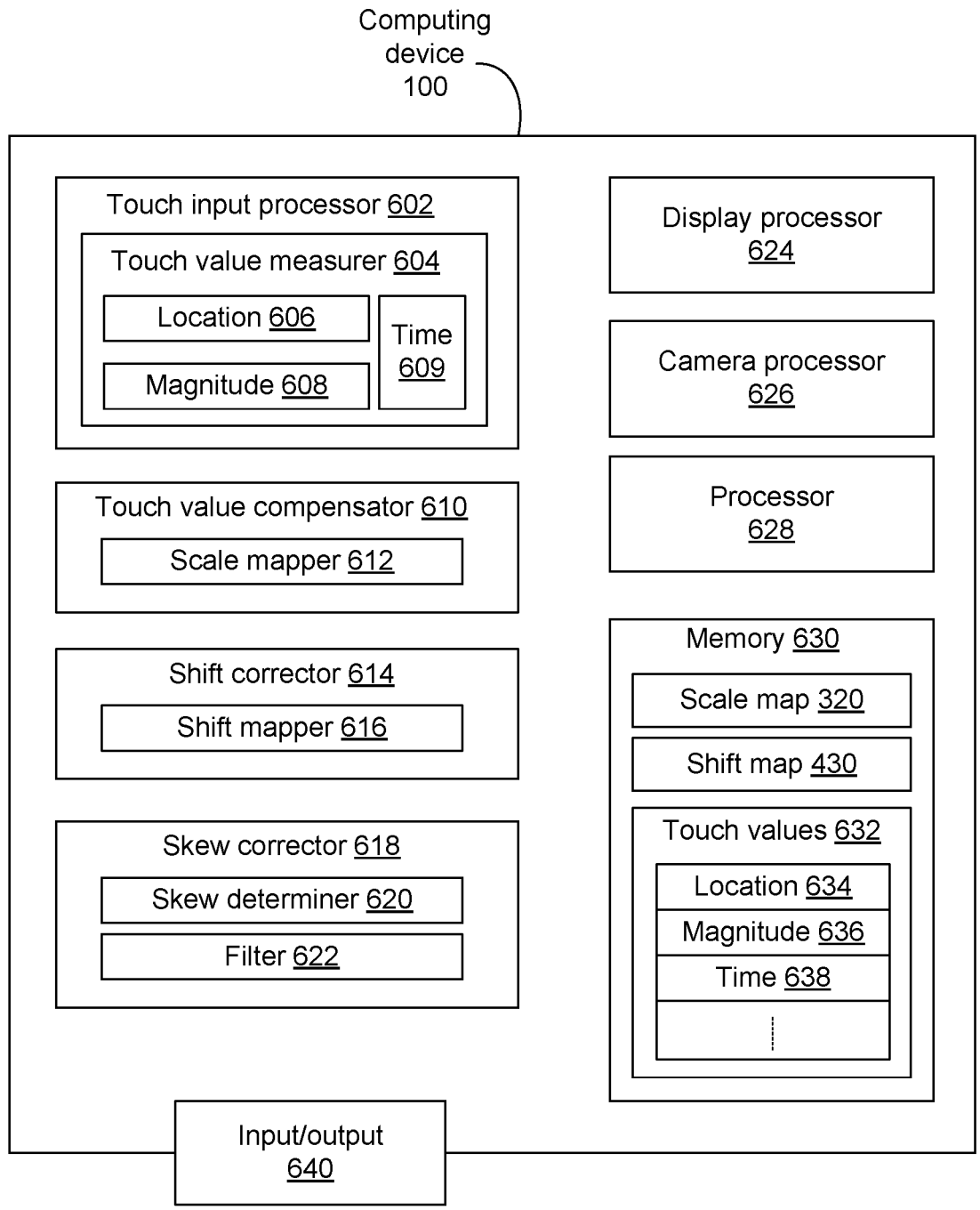
FIG. 6 is a schematic diagram of the computing device according to an example implementation.

FIG. 6 is a schematic diagram of the computing device 100 according to an example implementation. The computing device 100 can include a touch input processor 602. The touch input processor 602 can process touch input, such as by measuring changes in capacitance of touch sensors caused by objects contacting the touchscreen 102.

The touch input processor 602 can include a touch value measurer 604. The touch value measurer 604 can measure values associated with touch input to the touchscreen 102, such as location, magnitude, and/or time.

A location measurer 606 included in the touch value measurer 604 can measure a location of the touch input. The location can be measured based on which touch sensors experienced changes in capacitance. The location can be expressed and/or stored as an x-value and a y-value, which can represent a horizontal distance from a corner of the touchscreen 102 and a vertical distance from the same corner of the touchscreen 102. In some examples, the horizontal distance can be measured in pixels and/or the vertical distance can be measured in pixels.

A magnitude measurer 608 included in the touch value measurer 604 can measure a magnitude and/or force of the touch input. The magnitude can be measured based on an amount of the change in capacitance experienced by the touch sensors. The magnitude can be expressed and/or stored as an absolute value.

A time measurer 609 included in the touch value measurer 604 can measure a time and/or duration of the touch input. The time can be measured by comparing the change(s) in capacitance to a clock inside, and/or accessed by, the computing device 100. The time can be expressed and/or stored as an absolute date and/or time, or relative to a specific time. The duration can be a time between when the touch input began and when the touch input ended. The duration can be expressed and/or stored as seconds and/or fractions of seconds.

The computing device can include a touch value compensator 610. The touch value compensator 610 can compensate, enhance, and/or multiply measured touch values by a scaling value, which is based on, and chosen to compensate for, fewer touch sensors being at the location of a touch contact.

The touch value compensator 610 can include a scale mapper 612. The scale mapper 612 can map a location of a touch contact to a scaling value, such as a scaling value included in the scaling value map 320 shown in FIG. 3C. The touch value compensator 610 can multiply the measured touch value by the scaling value to generate a compensated touch value.

The computing device 100 can include a shift corrector 614. The shift corrector 614 can correct shifted touch location values that are caused by changes in the touch sensor density, such as shifted touch location values in the predefined area 400 described above with respect to FIG. 4A.

The shift corrector 614 can include a shift mapper 616. The shift mapper 616 can map detected and/or measured touch locations to shift values. The shift mapper 616 can, for example, determine whether the measured location of the touch input is within the predefined area 400. If the measured location is within the predefined area, the shift mapper 616 can determine a shift value based on the measured touch location. In some examples, the shift mapper 616 can determine the shift value by, for example, mapping the measured touch location to the shift value included on the shift map 410. In some examples, the shift mapper 616 can determine the shift value by finding a shift value, stored in a file, that is associated with the measured touch location. In some examples, instead of a shift value, the shift corrector 614 can determine a corrected location for the touch input by finding a corrected location, stored in a file, that is associated with the measured touch location.

The shift corrector 614 can determine a corrected and/or shifted location for the touch input based on the measured location and the shift value. The computing device 100 can process the touch input based on the shifted location and/or corrected location.

The computing device 100 can include a skew corrector 618. The skew corrector 618 can correct skewed locations where multiple touch inputs indicated that a location of at least one of the touch inputs is skewed. In some examples, the skew corrector 618 can correct the skewed locations after the touch value compensator 610 has corrected and/or compensated the measured touch value and/or the shift corrector 614 has corrected the shifted location.

The skew corrector 618 can include a skew determiner 620. The skew determiner 620 can determine that a location of at least one of multiple touch inputs is skewed. The skew determiner 620 can determine that the location of at least one of the multiple touch inputs is skewed based on the times and locations of the multiple touch inputs. The skew determiner 620 can, for example, determine that the location of at least one of the multiple touch inputs is skewed based on the multiple touch inputs not fitting a previously-stored pattern, such as an arc or a line.

The skew corrector 618 can include a filter 622. The filter 622 can correct the location of the touch input location that the skew determiner 620 determined was skewed. The filter 622 can correct the location of the skewed touch input location by applying a filter to the multiple touch inputs, such as an infinite impulse response filter, a Kalman filter, and/or a Butterworth filter.

The computing device 100 can include a display processor 624. The display processor 624 can control the graphical output generated by the touchscreen 102, such as based on instructions from one or more applications executing on the computing device 100 and/or an operating system executing on the computing device 100.

The computing device 100 can include a camera processor 626. The camera processor 626 can receive and/or process visual data received by the camera 106.

The computing device 100 can include at least one processor 628. The at least one processor 628 can execute instructions, such as instructions stored in at least one memory device 630, to cause the computing device 100 to perform any combination of methods, functions, and/or techniques described herein.

The computing device 100 may include at least one memory device 630. The at least one memory device 630 can include a non-transitory computer-readable storage medium. The at least one memory device 630 can store data and instructions thereon that, when executed by at least one processor, such as the processor 628, are configured to cause the computing device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 100 can be configured to perform, alone, or in combination with the computing device 100, any combination of methods, functions, and/or techniques described herein.

The memory 630 can store the maps, such as the scaling map 320 and/or shift map 410 described above. The memory 630 can store touch values 632, such as touch values described above. For each stored touch value 632, the memory 630 can store a location 634, a magnitude 636, and/or a time 638 and/or duration.

The computing device 100 may include at least one input/output node 640 (that is, interface). The at least one input/output node 640 may receive and/or send data, such as from and/or to, a server, and/or may receive input and provide output from and to a user. The input and output functions may be combined into a single node, or may be divided into separate input and output nodes. The input/output node 640 can include, for example, the touchscreen 102, the camera 106, a speaker, a microphone, one or more buttons, and/or one or more wired or wireless interfaces for communicating with other computing devices.

Figure 7:
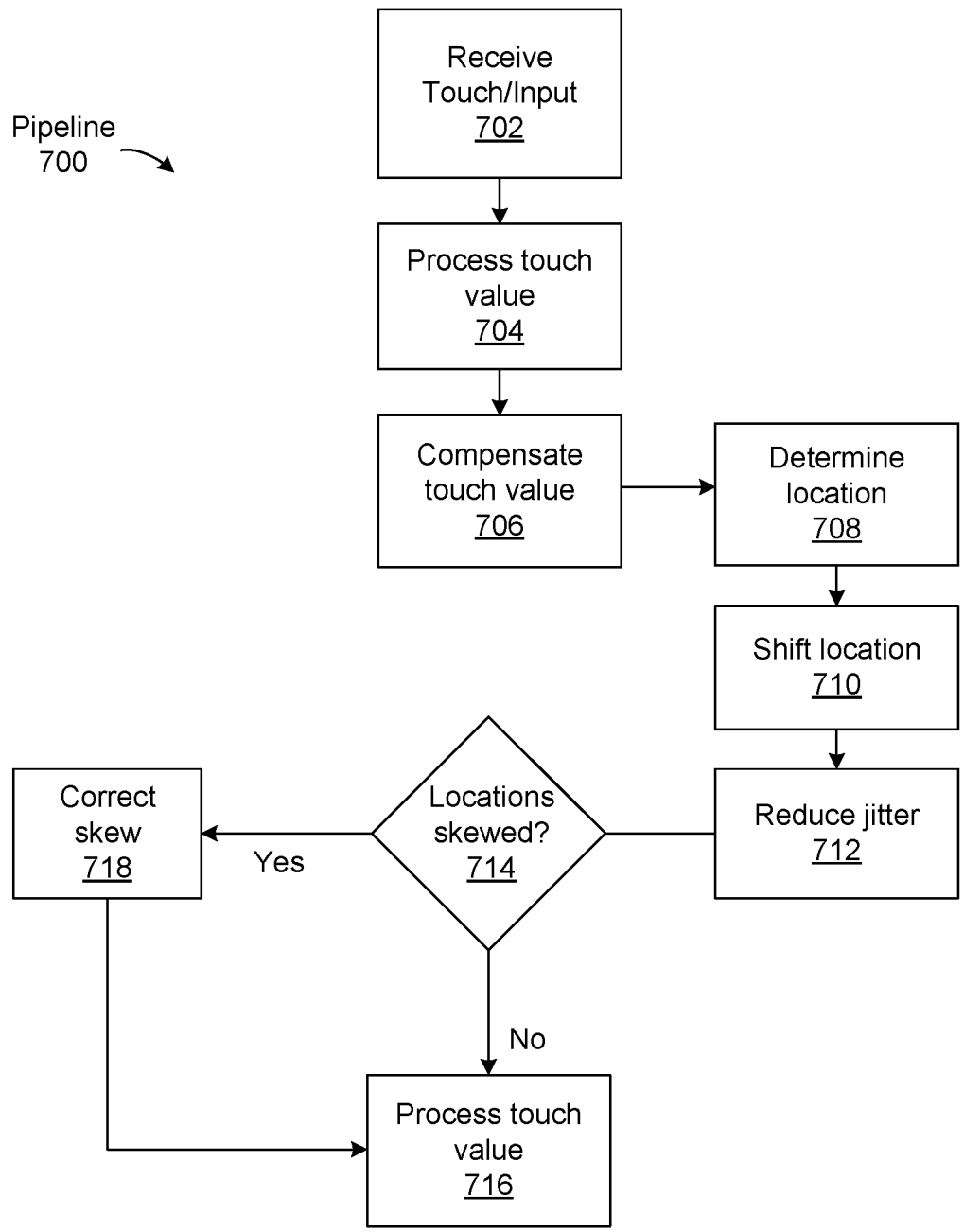
FIG. 7 shows a pipeline of functions performed by the computing device according to an example implementation.

FIG. 7 shows a pipeline 700 of functions performed by the computing device 100 according to an example implementation. The computing device 100 can receive touch input (702). The computing device 100 can receive the touch input via the touchscreen 102.

The computing device 100 can process a measured touch value (704). The computing device 100 can process the measured touch value by determining a magnitude of the touch value based, for example, on an amount of change to the capacitance of a touch sensor that detected the touch input.

The computing device 100 can compensate the measured touch value (706). The computing device 100 can compensate the measured touch value by, for example, determining a scaling value associated with a location of the touch input, and multiplying the measured touch value by the scaling value.

The computing device 100 can determine whether the location of the touch input is within the predefined area 400 (708). If the touch input is located within the predefined area 400, then the computing device 100 can shift the measured location of the touch input (710), such as by shifting the measured location of the touch input based on the shift map 410.

The computing device 100 can reduce jitter of the measured touch input (712). The computing device 100 can reduce the jitter of the measured touch input by, for example, applying a filter to multiple touch inputs, such as an averaging filter.

The computing device 100 can determine whether one or more locations, which may or may not have been shifted at (710), are skewed (714). The computing device 100 can determine whether the locations are skewed based on the locations and times of multiple touch input, such as by applying a filter to the multiple locations and times. If the computing device determines that the locations are not skewed, then the computing device 100 can process the touch values (716). If the computing device 100 determines that the locations are skewed, then the computing device 100 can correct the skew (718) and then process the corrected touch values (716).

Figure 8:
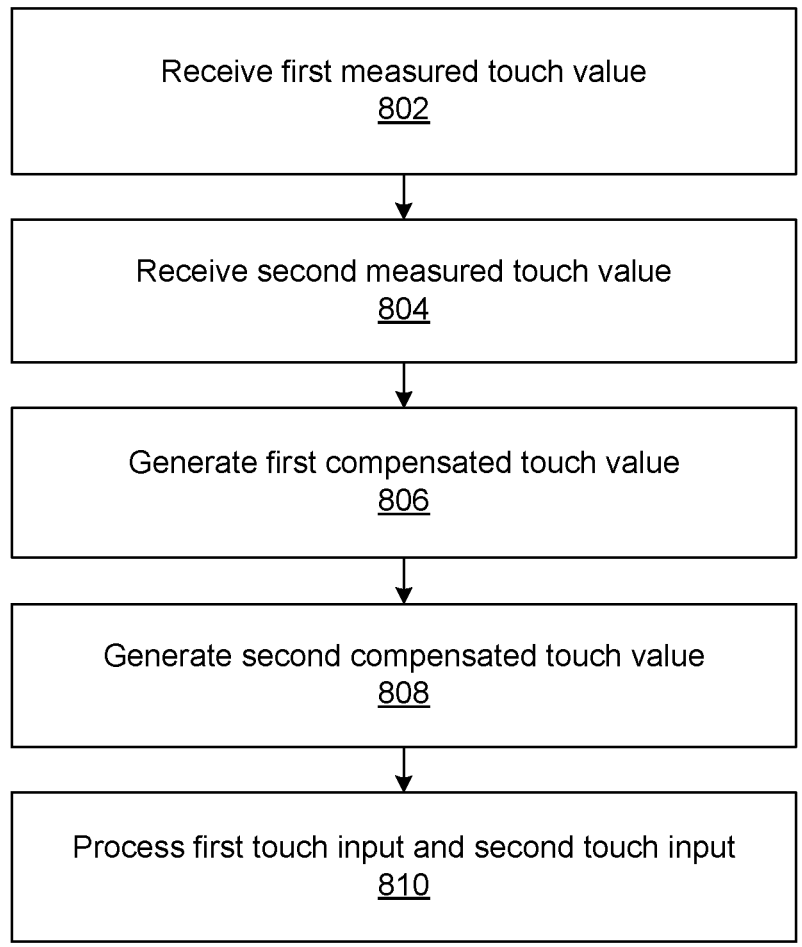
FIG. 8 is a flowchart showing a method performed by the computing device according to an example implementation.

FIG. 8 is a flowchart showing a method performed by the computing device 100 according to an example implementation. The method can include receiving a first measured touch value (802). The first measured touch value can indicate a first touch input at a first location, such as location 243, near a camera 106 included in the computing device 100. Examples of measured touch values are shown in FIG. 3B. The method can also include receive a second measured touch value (804). The second measured touch value can indicate second touch input at a second location, such as location 242, farther from the camera 106 than the first location. A density of touch sensors in the second location can be greater than a density of touch sensors in the first location. The method can also include generating a first compensated touch value (806). The first compensated touch value can be generated based on the first measured touch value and a first scaling value. Examples of scaling values are shown in FIG. 3C. The method can also include generating a second compensated touch value (808). The second compensated touch value can be generated based on the second measured touch value and a second scaling value. The second scaling value can be less than the first scaling value. The method can also include processing the first touch input and the second touch input (810). The first touch input and the second touch input can be processed based on the first compensated touch value and the second compensated touch value.

According to an example, a ratio between the first scaling value and the second scaling value can be inversely proportional to a ratio of the density of the touch sensors in the first location to the density of the touch sensors in the second location.

According to an example, the first measured touch value can indicate a change in capacitance in response to the first touch input.

According to an example, the second measured touch value can indicate a change in capacitance in response to the second touch input.

According to an example, the first measured touch value can be received from a touchscreen, such as the touchscreen 102.

According to an example, the first measured touch value can be received from a capacitive touchscreen.

Figure 9:
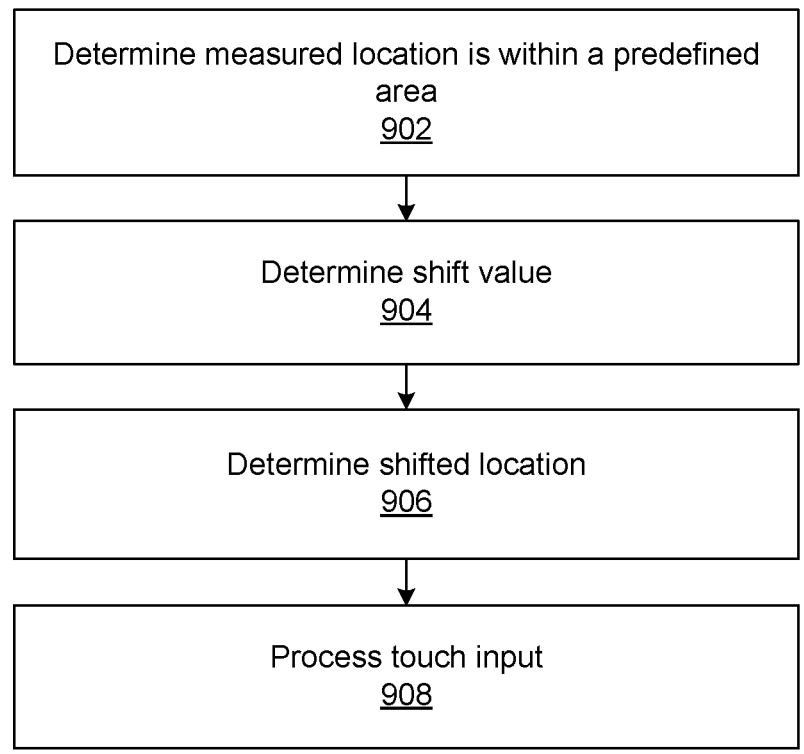
FIG. 9 is a flowchart showing a method performed by the computing device according to an example implementation.

FIG. 9 is a flowchart showing a method performed by the computing device according to an example implementation. The method can include determining that a measured location of a touch input on a touchscreen is within a predefined area (902). The predefined area, such as the predefined area 400, can be proximal to a camera 106. The method can include determining a shift value (904). The shift value, examples of which are shown graphically in FIG. 4B, can be for the touch input based on the measured location of the touch input. The method can include determining a shifted location (906). The shifted location can be determined for the touch input based on the measured location and the shift value. The method can include processing the touch input (908). The touch input can be processed based on the shifted location.

According to an example, the predefined area can have a shape that is homeomorphic with an annulus, and a hole, such as the hole 402, can be bounded by the shape. The hole can superpose at least a portion of the camera.

According to an example, determining the shift can comprise mapping the location of the touch input to the shift value.

Figure 10:
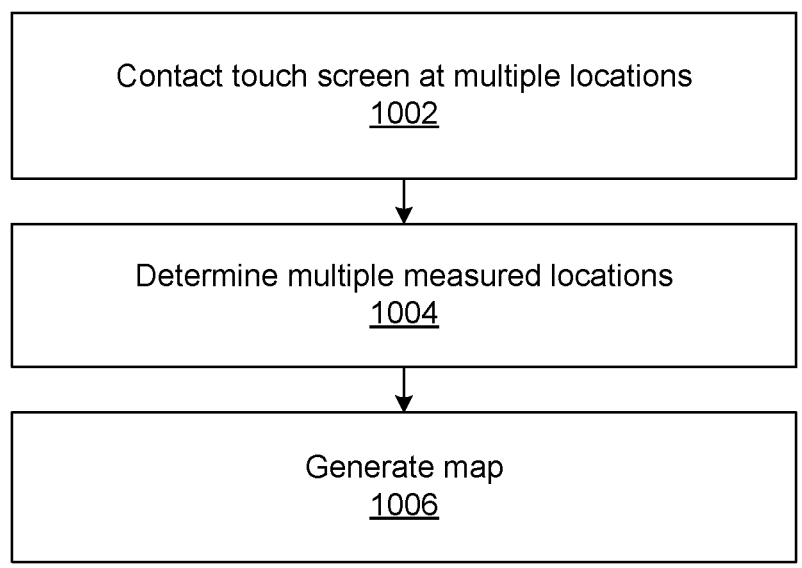
FIG. 10 is a flowchart showing a method performed by a computing system according to an example implementation.

FIG. 10 is a flowchart showing a method performed by a computing system according to an example implementation. The method can include contacting a touchscreen at multiple known locations (1002). An example of contacting the touchscreen 102 at multiple known locations is shown in FIG. 4C. An example of identifying known locations is shown in FIG. 2. The multiple known locations can include at least a first location, such as location 242, with a first density of touch sensors, and a second location, such as location 243, with a second density of touch sensors. The second density of touch sensors can be less than the first density of touch sensors. The method can also include determining multiple measured locations (1004). The multiple measured locations can be on the touchscreen 102. The multiple measured locations can correspond to the multiple known locations. The method can also include generating a map (1006). The map, an example of which can either be the shift map 410 shown in FIG. 4B or a map that substitutes measured locations to known locations, can map the multiple measured locations to the multiple known locations.

According to an example, the method can further comprise storing the map on a memory of a mobile computing device, such as the memory 630 of the computing device 100.

According to an example, the touchscreen can a first touchscreen, such as a first touchscreen on a measuring and/or calibrating device. The method further can further include receiving a touch input on a second touchscreen, such as the touchscreen 102. The method can further include determining that a location of the touch input on the second touchscreen 102 was within a predefined area, such as the predefined area 400, proximal to a camera 106. The method can further include determining a shift value, such as a shift value shown in FIG. 4B, for the touch input based on the location of the touch input and the generated map. An example of the generated map can be the shift map 410 shown in FIG. 4B. The method can also include processing the touch input based on the location of the touch input and the determined shift value. The touch input can be processed by a client device, such as the computing device 100.

Figure 11:
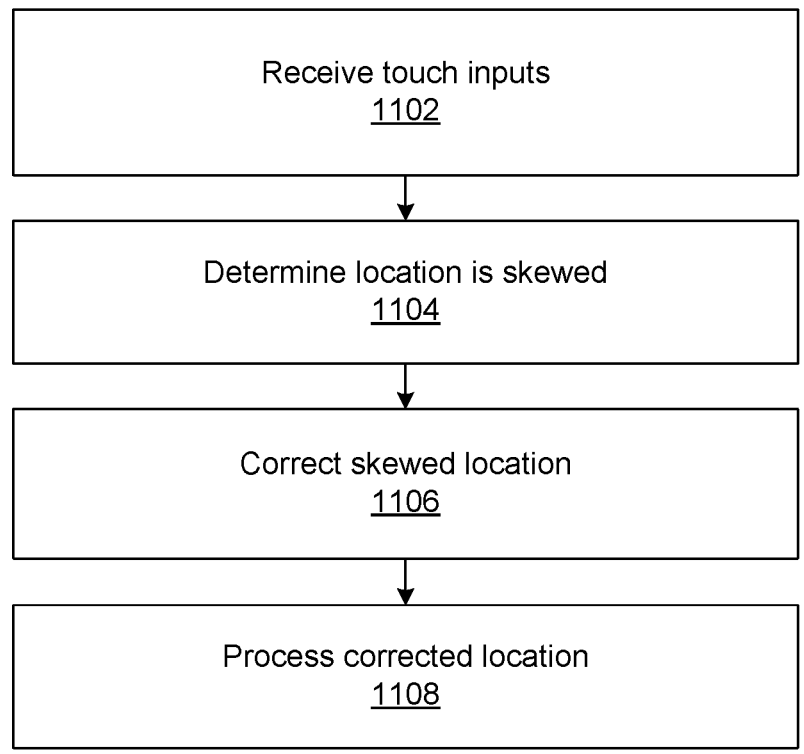
FIG. 11 is a flowchart showing a method performed by the computing device according to an example implementation.

FIG. 11 is a flowchart showing a method performed by the computing device 100 according to an example implementation. The method can include receiving multiple touch inputs (1102). The multiple touch inputs can be received at different times and can be included in a single moving contact. An example of the multiple touch inputs 502, 504, 506, 508, 510, 512 is shown in FIG. 5. The method can include determine that a measured location of at least one of the multiple touch inputs is skewed (1104). In the example of FIG. 5, touch inputs 506, 508 are determined to be skewed. The method can include, based on determining that the location of at least one of the multiple touch inputs is skewed, correcting the skewed location of the at least one of the multiple touch inputs (1106). The skewed location can be corrected based on the location of at least one of the multiple touch inputs that is skewed and locations of at least two other of the multiple touch inputs. Examples of at least two other of the multiple touch inputs are touch inputs 502, 504, 510, 512. The method can also include processing the multiple touch inputs with the corrected location (1108). The corrected location(s) can include corrected touch locations 507, 509.

According to an example, correcting the skewed location can include applying a filter to locations of the multiple touch inputs.

According to an example, correcting the skewed location can include applying an infinite impulse response filter to locations of the multiple touch inputs.

According to an example, correcting the skewed location can include applying a Kalman filter to locations of the multiple touch inputs.

According to an example, correcting the skewed location can include applying a Butterworth filter to locations of the multiple touch inputs.

According to an example, the multiple touch inputs can be received via a touchscreen, such as the touchscreen 102.

According to an example, the multiple touch inputs can be received via a capacitive touchscreen.

According to an example, the method can further include determining that the multiple touch inputs were received within a predetermined time period. The correcting the skewed location can comprise correcting the skewed location based on determining that the multiple touch inputs were received within the predetermined time period and determining that the location of at least one of the multiple touch inputs is skewed.

Figure 12:
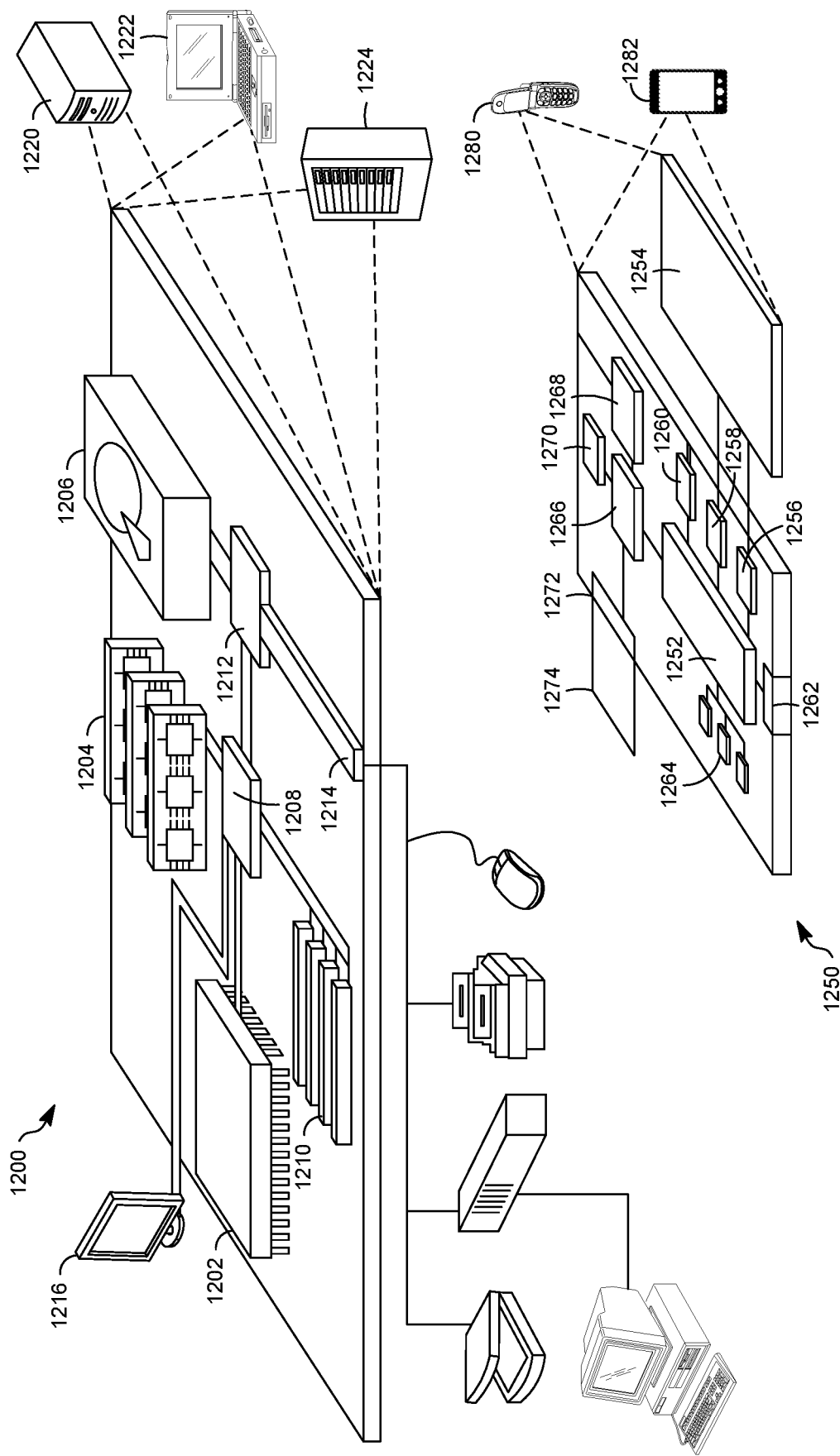
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium comprising instructions stored thereon that, when executed by at least one processor, are configured to cause a computing device including a camera located behind a touchscreen of the computing device and configured to capture visual data from light passing through the touchscreen to:
  receive, via the touchscreen, a first measured touch value, the first measured touch value indicating first touch input at a first location;
  receive, via the touchscreen, a second measured touch value, the second measured touch value indicating second touch input at a second location farther from the camera than the first location, a density of touch sensors in the second location being greater than a density of touch sensors in the first location, wherein the second location is not overlying the camera, and wherein the first location is overlying the camera such that the density of touch sensors overlying the camera is reduced relative to other locations on the touchscreen thereby causing the camera to capture the visual data from light passing through the first location;
  generate a first compensated touch value based on the first measured touch value and a first scaling value;
  generate a second compensated touch value based on the second measured touch value and a second scaling value, the second scaling value being less than the first scaling value; and
  process the first touch input and the second touch input based on the first compensated touch value and the second compensated touch value to compensate for reduced density of touch sensors in the first location as compared to the second location.

2. The non-transitory computer-readable storage medium of claim 1, wherein a ratio between the first scaling value and the second scaling value is inversely proportional to a ratio of the density of the touch sensors in the first location to the density of the touch sensors in the second location.

3. The non-transitory computer-readable storage medium of claim 1, wherein the first measured touch value indicates a change in capacitance in response to the first touch input.

4. The non-transitory computer-readable storage medium of claim 3, wherein the second measured touch value indicates a change in capacitance in response to the second touch input.

5. The non-transitory computer-readable storage medium of claim 1, wherein the touchscreen comprises a capacitive touchscreen.

6. A method comprising:
   receiving, via a touchscreen of a computing device, a first measured touch value, the first measured touch value indicating first touch input at a first location;
   receiving, via the touchscreen, a second measured touch value, the second measured touch value indicating second touch input at a second location farther from a camera of the computing device than the first location, wherein the camera is configured to capture visual data from light passing through the touchscreen, wherein a density of touch sensors in the second location being greater than a density of touch sensors in the first location, wherein the second location is not overlying the camera, and wherein the first location is overlying the camera such that the density of touch sensors overlying the camera is reduced relative to other locations on the touchscreen thereby causing the camera to capture the visual data from light passing through the first location;
   generating, by one or more processors of the computing device, a first compensated touch value based on the first measured touch value and a first scaling value;
   generating, by the one or more processors, a second compensated touch value based on the second measured touch value and a second scaling value, the second scaling value being less than the first scaling value; and
   processing, by the one or more processors, the first touch input and the second touch input based on the first compensated touch value and the second compensated touch value to compensate for reduced density of touch sensors in the first location as compared to the second location.

7. The method of claim 6, wherein a ratio between the first scaling value and the second scaling value is inversely proportional to a ratio of the density of the touch sensors in the first location to the density of the touch sensors in the second location.

8. A computing device comprising:
   a touchscreen comprising a plurality of touch sensors;
   a camera located behind the touchscreen and configured to capture visual data from light passing through the touchscreen, wherein a first location of the touchscreen overlies the camera and a second location of the touchscreen does not overly the camera, wherein a density of the plurality of touch sensors is greater at the second location than at the first location such that the density of touch sensors overlying the camera is reduced relative to other locations on the touchscreen;
   one or more processors configured to:
      receive, via the touchscreen, a first measured touch value, the first measured touch value indicating first touch input at a first location;
      receive, via the touchscreen, a second measured touch value, the second measured touch value indicating second touch input at a second location;
      generate a first compensated touch value based on the first measured touch value and a first scaling value;
      generate a second compensated touch value based on the second measured touch value and a second scaling value, the second scaling value being less than the first scaling value; and
      process the first touch input and the second touch input based on the first compensated touch value and the second compensated touch value to compensate for reduced density of touch sensors in the first location as compared to the second location.

9. The computing device of claim 1, wherein a ratio between the first scaling value and the second scaling value is inversely proportional to a ratio of the density of the touch sensors in the first location to the density of the touch sensors in the second location.

* * * * *